Dec. 19, 1967 W. G. HENTZSCHEL 3,358,589
WOOD ROOF TRUSS FABRICATION APPARATUS
Filed Dec. 20, 1965 7 Sheets-Sheet 3

INVENTOR.
WALTER G. HENTZSCHEL

BY

ATTORNEYS.

Dec. 19, 1967   W. G. HENTZSCHEL   3,358,589
WOOD ROOF TRUSS FABRICATION APPARATUS
Filed Dec. 20, 1965   7 Sheets-Sheet 5

INVENTOR.
WALTER G. HENTZSCHEL
BY Burns, Doane, Benedict, Sweeker, & Mathis
ATTORNEYS Dec. 19, 1967   W. G. HENTZSCHEL   3,358,589
WOOD ROOF TRUSS FABRICATION APPARATUS
Filed Dec. 20, 1965   7 Sheets-Sheet 6

INVENTOR
WALTER G. HENTZSCHEL

BY Burns, Doane, Benedict, Swecker, & Mathis
ATTORNEYS.

Dec. 19, 1967  W. G. HENTZSCHEL  3,358,589
WOOD ROOF TRUSS FABRICATION APPARATUS
Filed Dec. 20, 1965  7 Sheets-Sheet 7

FIG. 16

INVENTOR
WALTER G. HENTZSCHEL

BY *Burns, Doane, Benedict, Swecker, & Mathis*

ATTORNEYS.

United States Patent Office 3,358,589
Patented Dec. 19, 1967

3,358,589
WOOD ROOF TRUSS FABRICATION APPARATUS
Walter G. Hentzschel, Bethesda, Md., assignor to Timber Engineering Company, Washington, D.C., a corporation of Delaware
Filed Dec. 20, 1965, Ser. No. 520,823
23 Claims. (Cl. 100—100)

This invention relates to wood roof truss fabrication and more particularly to apparatus for assembling wood roof trusses.

Prefabricated wood roof trusses are used in building construction, particularly in house construction. The wood members in the truss are joined together by truss plates that are nailed across the joints. When the roof trusses are assembled, they are usually quite large and, in order to minimize transportation costs, it is desirable to have the fabrication site reasonably near the building side. Therefore, apparatus for fabricating wood roof trusses is usually set up in lumber yards or other facilities where it is not necessary to transport the completed roof trusses a great distance to the building site. Mechanized truss fabrication apparatus that is presently available requires too great an investment to be economically feasible unless the roof trusses are produced in large quantities.

Truss plates may be secured to the wood members either by nails individually driven through the truss plates and into the wood members, or by integral teeth that are punched from the truss plates and pressed into the wood members by means of press equipment. An advantage of using toothed truss plates is that the plates on opposite sides of the wood members may be pressed simultaneously into the wood and it is not necessary to turn over the partially completed wood truss in order to apply the truss plates on the opposite side of the truss. Another advantage is that the roof trusses usually can be fabricated more quickly using toothed type truss plates than by hand nailing.

The size and shape of the roof trusses depend on the slope or style of the roof of the building in which they are to be installed and on the length of span required between the walls supporting the roof trusses. For different spans of roof trusses, the distances between the heel joints, bottom chord panel points, and the bottom chord splice are varied, but all of these joints remain substantially along the same straight line. The peak joint of a roof truss may be varied, depending upon the slope of the roof, but it is always substantially in alignment with the midpoint of the bottom chord and therefore the adjustment is made substantially along a straight line extending at right angles to the bottom chord. The top chord panel points are preferably positioned about midway of the top chords and the positions of the top chord panel points therefore depend upon the slope of the roof and the length of the span of the truss. Consequently, the positions of either of the top chord panel points do not define a straight line, but rather circumscribe general regions within which the top chord panel points may be located. Adjustment of the position of the top chord panel points, therefore, is awkward in conventional roof truss fabrication apparatus.

Roof trusses are often prestressed when they are being fabricated, so that they will be able to withstand a greater load. Generally, the trusses are prestressed by holding the outer ends of the truss at the heel joint stationary and deflecting the center portion of the bottom chord toward the peak joint. While the truss is being prestressed, there is a load imposed on the apparatus supporting the truss, and the apparatus must be capable of withstanding this prestressing force.

Accordingly, it is an object of this invention to provide improved apparatus for fabricating wood roof trusses.

It is a further object of this invention to provide wood roof truss fabrication apparatus that is readily adjustable over wide ranges of sizes and shapes of roof trusses.

A still further object of this invention is to provide apparatus for rigidly supporting wood members while truss plates are being applied, and while the truss is being prestressed.

Another object of this invention is to provide wood roof truss fabrication apparatus that may be easily installed and operated.

These objects are accomplished in accordance with the preferred embodiment of the invention by truss fabrication apparatus having a plurality of individual stations supporting the wood members at each of the joints in a roof truss. The stations supporting the heel joints, bottom chord panel points and bottom chord splice are mounted on a pair of rails which extend substantially parallel to the bottom chord of the truss. The peak joint station is supported on a separate pair of rails that extend substantially perpendicular to the rails for the bottom chord. The top chord panel point stations are mounted on wheels for universal movement relative to a roof truss. The top chord panel point stations each has an articulated arm which is secured on opposite sides of the articulated joint to the rails that are mounted in the floor. The articulated arm rigidly secures the station in the desired position. The top chord panel point rails extend obliquely of the bottom chord rails and the position of the top chord panel point station is universally adjustable. Each of the stations has an open side facing away from the roof truss to receive a press which is movable from one station to another and is preferably mounted on a cart for rolling over the floor.

This preferred embodiment is illustrated in the accompanying drawings in which.

Figures 1, 2:
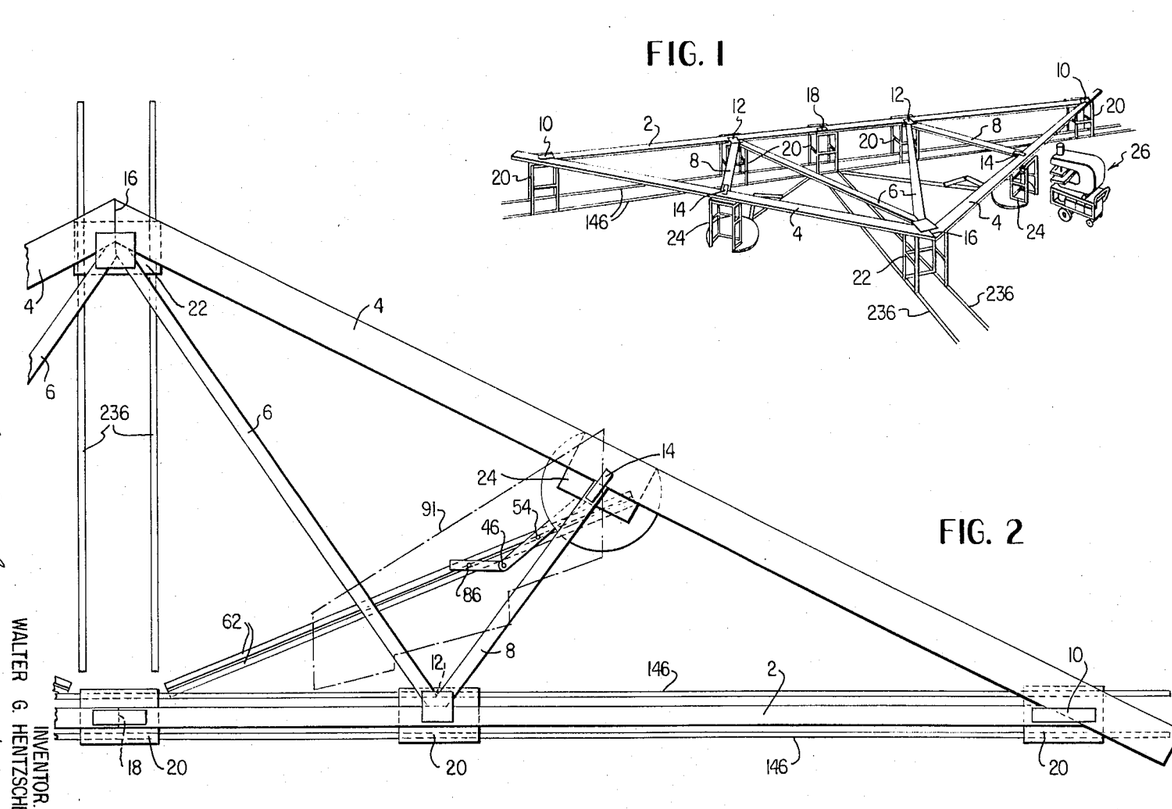
FIG. 1 is a perspective view of the truss fabrication apparatus of this invention.
FIG. 2 is a top plan view of a portion of the apparatus of this invention.

Referring to FIG. 1, a typical roof truss includes a bottom chord 2, a top chord 4, and web members 6 and 8. The wood members of the truss are joined together by truss plates at the heel joints 10, the bottom chord panel points 12, the top chord panel points 14, the peak joint 16 and the bottom chord splice 18. Each of these joints has a truss plate applied on opposite sides of the wood members. The truss plates have teeth which are struck out from the plate, and the teeth of the plates are pressed into the wood members.

The wood members are supported at a convenient working height by stations at each of the joints. The bottom chord stations 20 are substantially identical, although the supporting surface at the top of each station may be altered slightly as appropriate for receiving the respective wood members of the roof truss. The peak joint station 22 is similar in construction to the bottom chord stations 20. The structure of the top chord panel point stations 24, however, is quite different from that of the other stations. A cart 26 supports a press for movement from one station to another for pressing the truss plate into the wood members.

The top chord panel point station 24 is shown in detail in FIGS. 3 to 7. The top chord panel point station has an upright stand 28 including upright posts 30 at each corner that are connected together at the top by longitudinal bars 32 and transverse bars 34. The stand 28 is mounted on a plate 36 by welding on other suitable means. The plate 36 has a rectangular opening 38 of substantially the same shape and size as the interior of the frame formed between the bars 32 and 34. At the bottom of the stand 28 there are transverse bars 40 which extend between the upright posts 30 and a longitudinal bar 42. The opening 38 is defined by the lower transverse bars 40 and the edge of the plate 36 adjacent the longitudinal bar 42 which extends between the posts 30.

Figures 3, 4, 5:
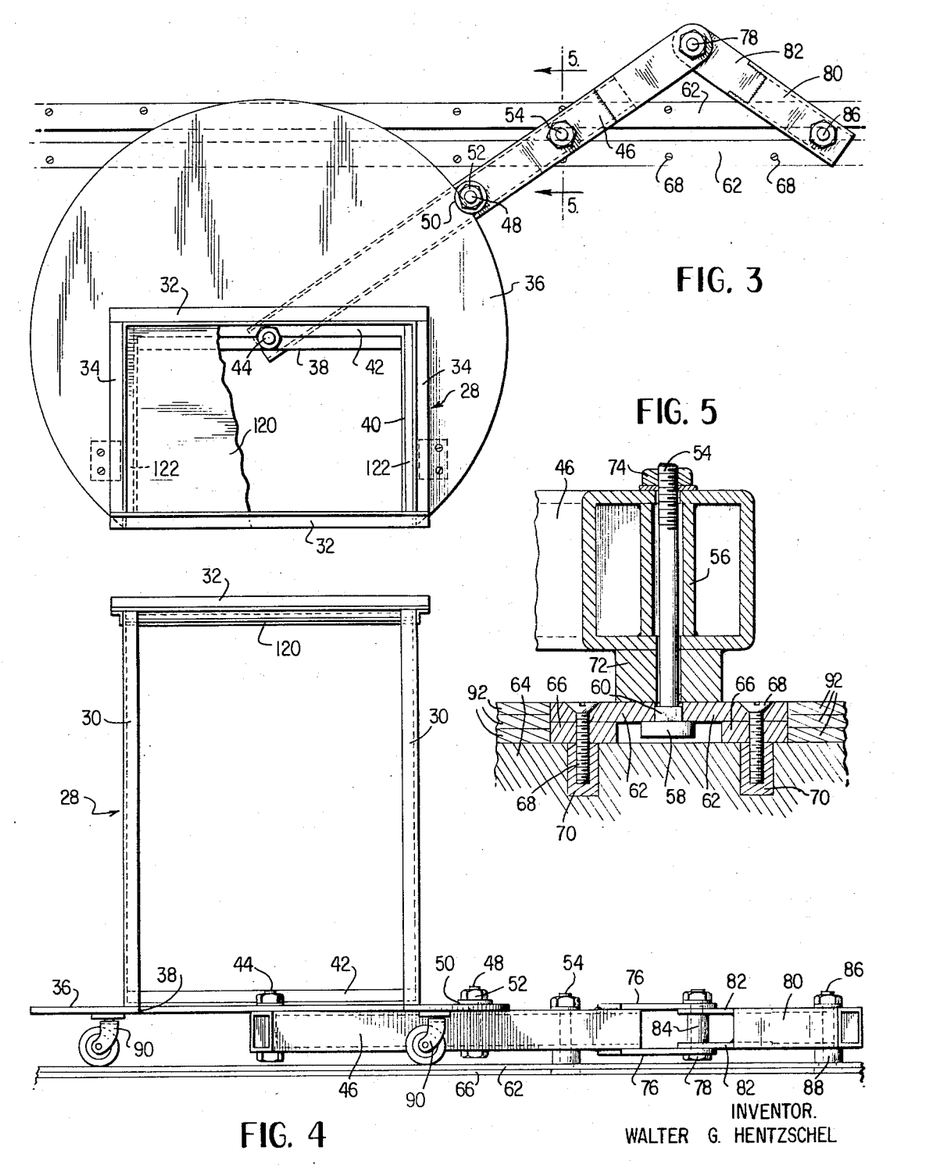
FIG. 3 is an enlarged top plan view of a top chord panel point station.
FIG. 4 is a front elevational view of the top chord panel point station.
FIG. 5 is a cross sectional view of the floor mounting for the top chord panel point station along the line 5—5 in FIG. 3.

The plate 36 is substantially circular, except for the rectangular opening 38 and at the center of the plate 36 there is a pivot pin 44 which extends below the plate 36. A bar 46 in the form of square tubing extends across the bottom of the plate 36 and has aligned holes at one end for receiving the pivot pin 44. The bar 46 is clamped between the head of the pivot pin 44 and the bottom of the plate 36. Preferably, there is sufficient clearance between the bar 46 and the bottom of the plate 36 to allow the bar to swing freely about the pin 44. At the periphery of the plate 36, there is a clamp for locking the plate 36 against turning relative to the bar 46. The clamp includes a bolt 48 extending through the bar 46. A washer 50 on the bolt 48 overlaps the edge of the plate 36 and a nut 52 on the bolt 48 is tightened against the washer to clamp the plate 36 between the bar 46 and the washer 50. The bar 46 is adapted to be rigidly secured to the floor and includes a bolt 54 which extends through the hollow bar 46, as shown in FIG. 5. The bar 46 is reinforced by a sleeve 56 around the bolt. The head 58 of the bolt has a recessed portion 60 with flat opposite sides, so that it may be received in a T-slot. The T-slot is formed between the rails 62 which are rigidly secured to the floor 64. The rails 62 are spaced above the surface of the floor by spacer strips 66. Both the rails and the spacers are secured to the floor by screws 68 which are threaded into anchors 70 embedded in the floor 64. The strips 66 have a greater thickness than the bolt head 58 and the space between the rails 62 is slightly greater than the width of the recessed portion 60 of the head. A collar 72 on the bolt 54 is interposed between the bar 46 and the rails 62. When a nut 74 on the end of the bolt 54 is tightened, the rails 62 are clamped between the spacer 72 and the bolt head 58, so that the bar 46 cannot move relative to the rails.

In order to prevent the bar 46 from swinging about the bolt 54, the bar is hinged and secured to the rails again on the opposite side of the hinge. At the end of the bar 46, a pair of plates 76 extend outwardly in the form of a clevis. A hinge bolt 78 extends through aligned holes in the ends of the plates 76 and a strut 80 is mounted for swinging movement on the bolt 78. The strut 80 has a pair of plates 82 extending outwardly from one end and the bolt 78 extends through holes in the ends of the plates 82. A spacer sleeve 84 (FIG. 4) is provided between the plates 82 and around the bolt 78. The strut 80 has a bolt 86 at the end opposite the hinge formed by the bolt 78. The bolt 86 has a T-slot head which is received between the rails 62 and is substantially identical with the bolt 54, shown in FIG. 5. There is also a spacer collar 88 between the rails and the strut 80. When the nuts on the bolts 54 and 86 are loosened, the entire panel point station assembly may move relative to the rails 62. Casters 90 are mounted on the bottom of the plate 36 to support the plate and the upright stand 28 for universal movement over the floor. As shown in FIG. 5, several layers of sheet material 92, such as metal, plywood or particle board, are laid on the surface of the floor 64, so that the surface over which the casters 90 move is substantially in the same plane as the surface of the rails 62. The casters 90 are larger than the slot btween the rails 62 and, therefore, the stand 28 and the plate 36 may be moved readily across the rails to the desired position.

Referring to FIGS. 1 and 2, the rails 62 extend obliquely to the bottom chord 2. Preferably, the included angle between the bottom chord 2 and the longitudinal axis of the rails 62 should be about 22½ degrees. With the rails thus positioned, the top chord panel point may be fabricated for any truss in which the panel point is located within the area 91 shown in phantom lines. The area 91 includes the commonly used slopes and sizes of roof trusses. Of course, if roof trusses having very large or very small slopes and sizes are to be fabricated, the position of the rails 62 may have to be changed. The position of the station 24 can be readily adjusted by loosening the T-slot bolts 54 and 86 and sliding the bolts along the rails. At the same time, the bar 46 may be turned about the bolt 54. When the desired position is reached, the nuts on the bolts 54 and 86 are tightened to secure the station rigidly to the rails. The position of the stand 28 may be turned to coincide with the axis of the top chord by loosening the nut 52, turning the plate 36 relative to the bar 46, and then tightening the nut again.

Figures 6, 7, 8:
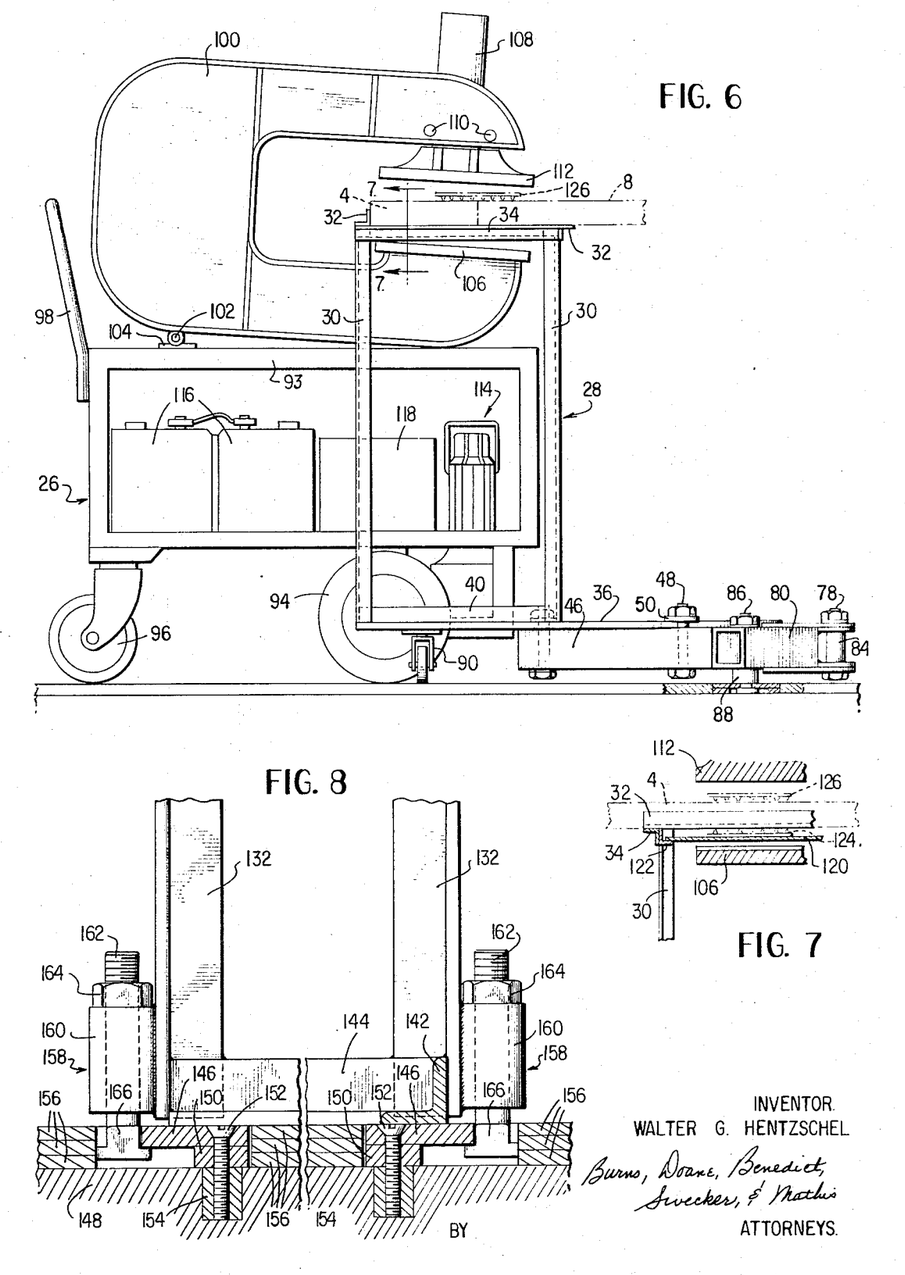
FIG. 6 is a side elevational view of the top chord panel point station, with the press cart positioned therein.
FIG. 7 is an enlarged cross sectional view along the line 7—7 in FIG. 6.
FIG. 8 is a cross sectional view of a bottom chord panel point station along the line 8—8 in FIG. 9.

The cart 26 that is to be used with the stations of this invention for applying the truss plates includes a frame 93, as shown in FIG. 6, which is mounted on a pair of front wheels 94 and rear wheels 96. The front wheels 94 are mounted on a fixed axle. The rear wheels are mounted in a caster assembly, so that the cart may be guided into each of the stations of the press apparatus. The cart has a handle 98 for pushing the cart over the floor.

A press frame 100 is mounted on top of the frame 93, and is rigidly secured to a bar 102 that is journaled in bearings 104 on opposite sides of the frame 93. The press frame 100 has a lower platen 106 which is rigidly secured to the frame 100. A hydraulic cylinder 108 is mounted in the press frame 100 by means of bolts or pins 110. By removing the pins 110, the hydraulic cylinder 108 may be disassembled from the frame 100 for repairs or servicing. The piston of the hydraulic cylinder 108 is connected with the movable platen 112 which is arranged directly opposite the lower platen 106 and is substantially parallel with the lower platen.

The hydraulic cylinder 108 is supplied with fluid under pressure by a motor-pump unit 114 which is operated by batteries 116. A battery charger 118 may also be mounted on the cart. A hose is connected between the pump unit 114 and the hydraulic cylinder 108, but the hose is not shown in the drawing. Thus, the cart 26 is a self-contained press unit which may be moved about from one station to another for pressing the truss plates into the wood members.

The operation of the press in securing together the wood members of a top chord panel point is shown schematically in FIGS. 6 and 7. The top chord 4 and the compression web member 8 are shown in phantom lines. The top chord 4 is positioned against the bar 32 at the front of the stand 28 and extends substantially parallel to the bar 32. A floating plate 120 is supported in the frame at the top of the stand 28 by a shelf 122 which is secured along the lower edge of the bar 34. A corresponding shelf is provided on the other transverse bar 34 for supporting the opposite end of the plate 120. A suitable truss plate 124 is positioned on the floating plate 120 with the teeth of the plate facing upwardly. Another metal truss plate 126 is positioned on top of the wood members 4 and 8 with the teeth projecting toward the wood members. After the press has been moved into the position shown in FIG. 6, hydraulic fluid is supplied to the hydraulic cylinder 108, causing the upper platen 112 to be displaced downwardly toward the wood members. When the upper platen 112 engages the truss plate 126, the press frame 100 swings upwardly about the bearings 104 until the fixed platen 106 engages the floating plate 120. As the press platens move toward each other, the truss plates 124 and 126 are pressed into the wood members and the lower platen, together with the floating plate 120, continues to move upwardly, until the cooperating faces of the platens are substantially horizontal and the truss plates are fully embedded in the wood members. Hydraulic fluid is then drained from the cylinder 108 to allow the press platens to return to the positions shown in FIG. 6. The top chord 4 and the web member 8 are rigidly joined together by the truss plates and the cart 26 may be moved to the next station.

The stands for the peak joint and the bottom chord joints, including the bottom chord splice, the bottom chord panel points and the heel joints, generally have the same basic structure, except that the rails supporting the bottom chord stations extend transversely of the stands, while the rails supporting the peak joint stand extend substantially longitudinally of the stand. The bottom chord panel point stand 130 is shown in FIGS. 8 to 11. The stand 130 has upright posts 132 at each corner. The posts 132 are secured together at the top by transverse bars 134 and longitudinal bars 136. A floating plate 138 is supported at its opposite ends on the transverse bars 134 and is movable upwardly in the same manner as the plate 120 in FIGS. 3 to 7. Additional bracing in the form of metal straps 140 is secured between the posts 132. The lower ends of the posts 132 are secured together by an angle member 142 that extends across the back of the stand and angle members 144 that extend across the sides of the stand. The front of the stand remains open to receive the cart 26.

The stand 130 is supported on a pair of rails 146. The rails 146 are spaced above the surface of the floor 148 by spacer strips 150, between the rails 146 in the floor. Screws 152 extend through the rails and through the strips 150 and are rigidly secured in anchors 154 in the floor 148. A false floor may be built up to the level of the rails 146 by laying sheet material 156, such as plywood or composition board, on the surface of the floor. Thus, the rails cooperate with the sheets 156 to form slots in the floor.

Guide members 158 are secured to the lower end of each of the posts 132 in position to cooperate with the rails 146 to prevent displacement of the stand 130 off of the rails 146. The guide members 158 each includes a sleeve 160 which is welded or otherwise secured to the post 132. A T-slot bolt 162 extends through the sleeve 160. A nut 164 that is threaded on the bolt bears against the end of the sleeve. The bolt head 166 overlaps the edge of the rail 146, as shown in FIG. 8. When the nut 164 is tightened against the sleeve 160, the head 166 grips the rail and prevents movement of the stand relative to the rail. Similarly, the other guide members 158 may be tightened to lock the stand in position on the rails. When the guide members are loosened, the bolt heads guide the stands along the rails when they are moved from one location to another.

Figure 12:
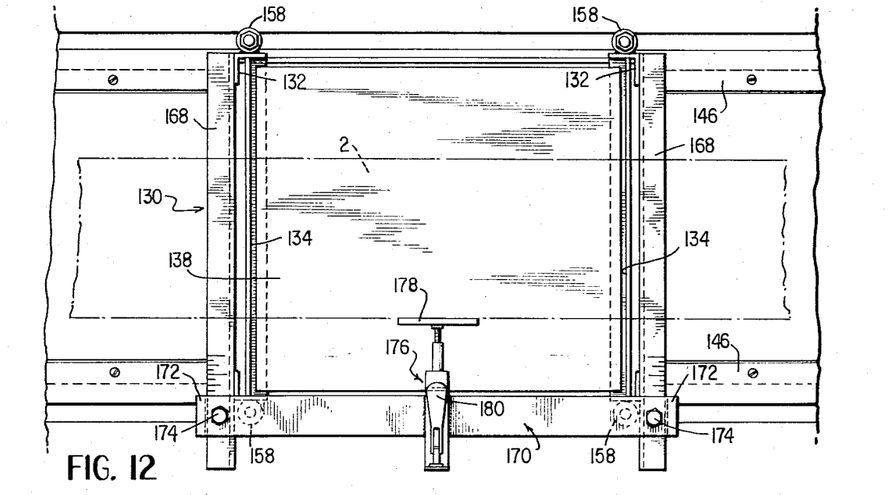
FIG. 12 is a top plan view of the bottom chord splice station.
Figure 13:
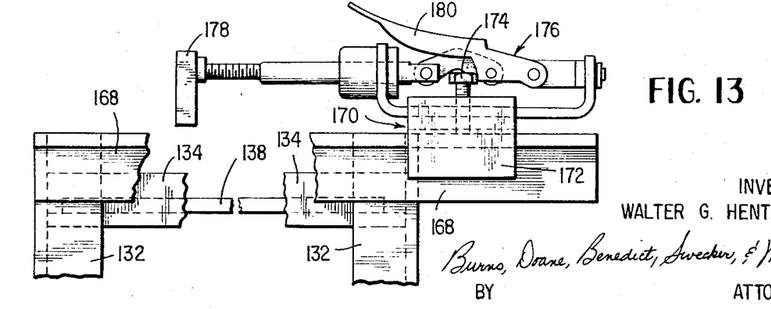
FIG. 13 is a side elevational view of the bottom chord splice station.

A base portion of the bottom chord panel point stand 130 shown in FIGS. 8 to 11 is adapted to be used at the various joints in the roof truss by modifying the supporting surface of the stand. The stand 130 as modified for the bottom chord splice is shown in FIGS. 12 and 13. The stand 130 has an angle bar 168 secured along each opposite side at the top of the upright posts 132. Mounted between the bars 168 is a bottom chord stop 170 including C-clamp brackets 172 at its opposite ends. The brackets 172 overlap the outwardly projecting edges of the bars 168, and a set screw 174 in each of the brackets 172 engages the bar 168 to clamp the stop 170 at the desired position. An adjustable clamp 176 is mounted on the stop 170. The clamp 176 has a bearing plate 178 and the position of the plate may be adjusted by raising and lowering the lever 180. Preferably, the clamp 176 has a toggle linkage. When the bottom chord member 2 is supported across the bars 168, the clamp 176 will be used to impose a force at the center of the roof truss in the direction of the peak joint, thereby prestressing the truss members. Of course, if the bottom chord 2 is in two sections and a splice is made at the center of the span, the truss plates would be pressed into the bottom chord members before prestressing.

Figure 9:
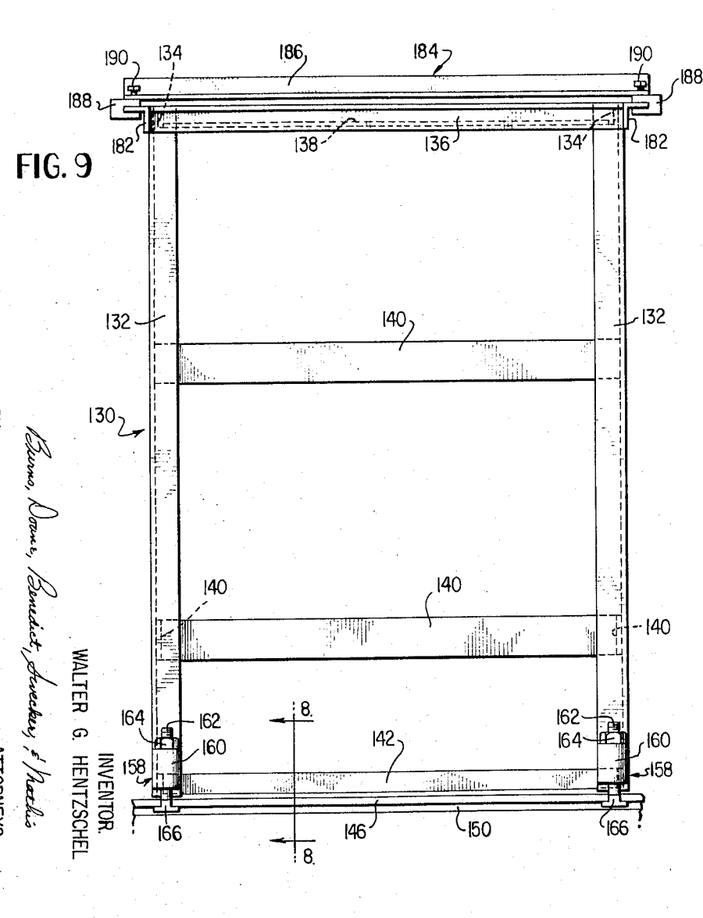
FIG. 9 is a front elevational view of the bottom chord panel point station.
Figure 10:
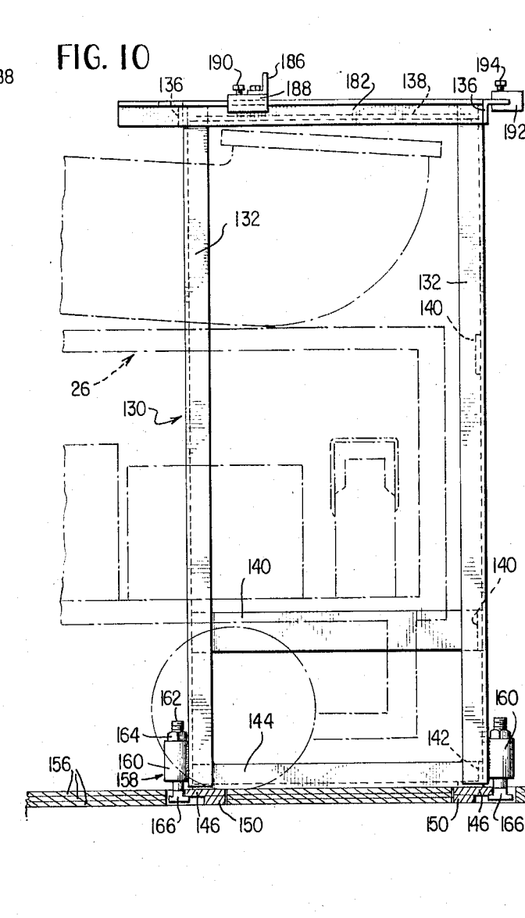
FIG. 10 is a side elevational view of the bottom chord panel point station showing the cart positioned therein.
Figure 11:
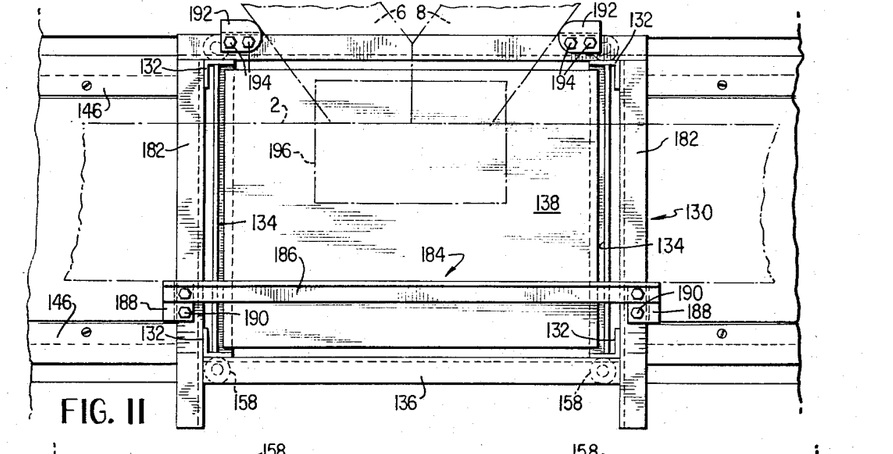
FIG. 11 is a top plan view of the bottom chord panel point station.

The support surface of the stand 130 adapted for assembling the bottom chord panel points is shown in FIGS. 9 to 11. Angle bars 182 are secured between the upright posts 132. A bottom chord stop 184 is formed of an angle bar 186 which has C-clamp brackets 188. The brackets are selectively clamped to the bars 182 by set screws 190. The bottom chord stop 184 is fixed in position with respect to the bars 182 to prevent displacement of the bottom chord 2 while the roof truss is being assembled. Web stop blocks 192 which are also in the form of C-clamps cooperate with the bar 136 for positioning the tension and compression web members of the roof truss. The stop blocks 192 have set screws 194 for positioning the blocks relative to the bar 136. The relative positions of the wood members 2, 6 and 8 and the position of a truss plate 196 for the bottom chord panel point are shown in phantom lines in FIG. 11.

Figure 14:
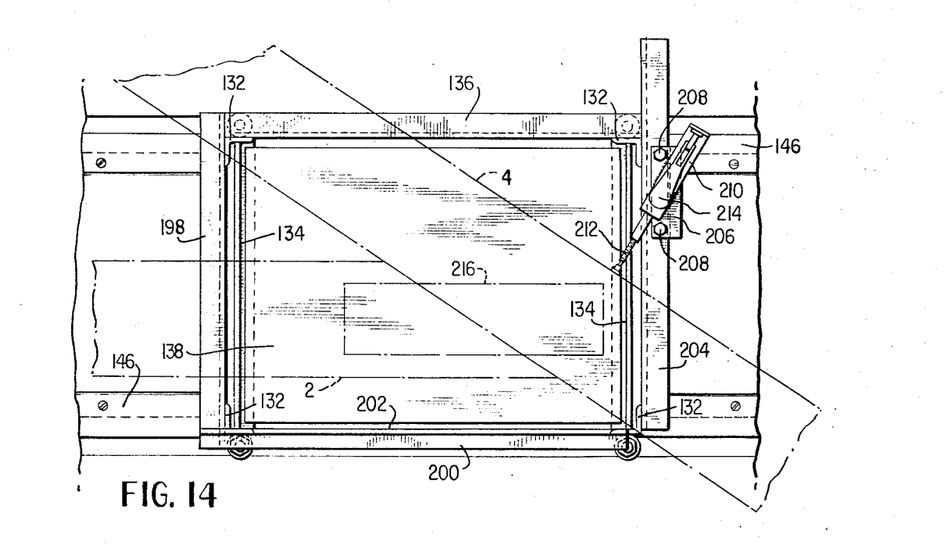
FIG. 14 is a top plan view of the heel joint station.

The right hand heel joint jig is shown in FIG. 14. An angle bar 198 is secured between the left hand posts 132 in substantially the same plane as the rear angle bar 136. At the front of the stand, an angle bar 200 is welded at the upper end of the front posts 132, so that the upright side portion 202 of the angle bar projects above the plane of the angle bars 136 and 198. At the right hand side of the stand, an angle bar 204 is secured at the top of the posts 132 substantially in alignment with the bars 136 and 198. A C-clamp bracket 206 is adjustably secured on the bar 204 by means of set screws 208. The bracket 206 is substantially the same as the brackets 188, shown in FIGS. 9 to 11, although it has a greater length to accommodate a toggle clamp 210 which is rigidly secured to the top of the bracket 206. The toggle clamp has a plunger 212 which is adjustable longitudinally by moving the lever 214. In the position shown in FIG. 14, the plunger 212 is fully extended for clamping a top chord member 4 against the end of the upright portion 202 of the angle bar 200 and against the end of the bottom chord member 2. The position of the bottom chord 2 is fixed by the bottom chord panel point jigs and the bottom chord splice jig. A metal truss plate of appropriate size may be placed on the floating plate 138 with the teeth projecting upwardly and another plate 216 is placed on top of the wood members 2 and 4 for pressing into the joint. The left hand heel joint jig is identical with the jig shown in FIG. 14, except that the positions of the bars 198 and 204 are reversed and the plunger 212 projects inwardly toward the plate.

Figure 15:
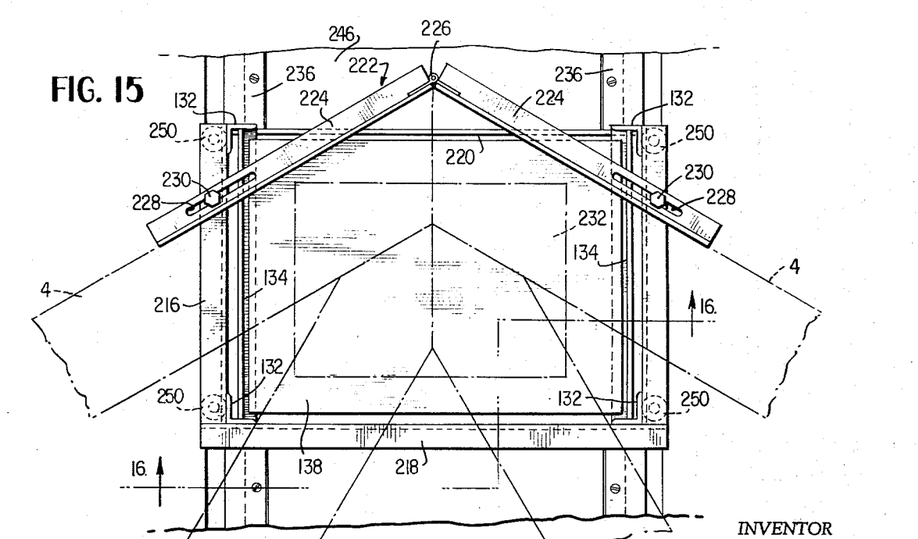
FIG. 15 is a top plan view of the peak joint station.
Figure 16:
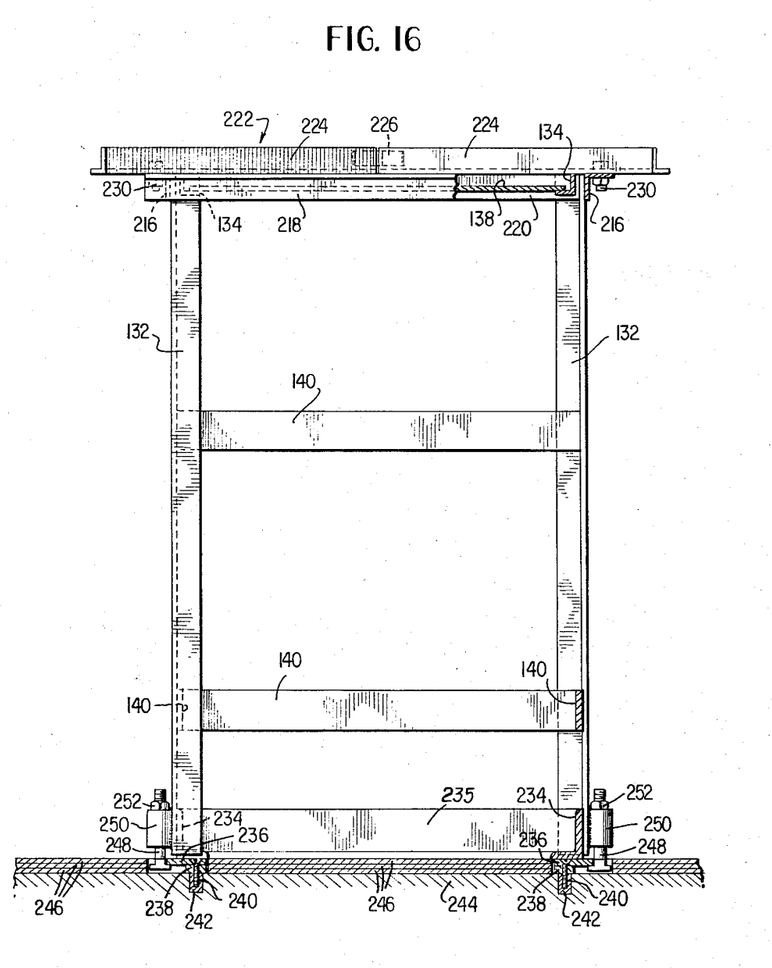
FIG. 16 is a front elevational view of the peak joint station.

The stand for the peak joint station 22 is shown in detail in FIGS. 15 and 16. The stand includes upright posts 132 which are joined together at the top by transverse angle bars 216 and a front angle bar 218. A narrow strap 220 extends across the back of the stand at the top of the posts 132. On the interior of the stands there are angle bars 134 secured between the upright posts 132 which form a shelf for supporting the floating plate 138. A peak joint stop 222 is positioned on top of the bars 216 to hold the top chord members 4 in position while the truss is being assembled. The peak joint stop includes angle bars 224 which are secured together at one end by a hinge 226. Each of the bars 224 has a longitudinal slot 228 for receiving a bolt 230. The bolt extends through the respective bars 216 for rigidly securing the stop 222 in position on the stand. The slots 228 permit longitudinal adjustment of the bars 224 relative to the angle bars 216 and the hinge 226 permits adjustment of the angle at the peak joint. The top chord members 4, the tension web members 6 and a truss plate 232 are shown in phantom lines in FIG. 15 as assembled on the peak joint stand. A similar truss plate is positioned on the opposite side of the wood members with the teeth projecting toward the wood members.

As shown in FIGS. 1 and 2, the rails supporting the peak joint stand extend longitudinally of the stand and the opening in the stand for receiving the cart 26 is between the rails. Referring to FIG. 16, the stand has longitudinal angle bars 234 secured between the posts 132. The surface of the bars 234 projects below the lower ends of the posts 132 to provide bearing surfaces. A transverse bar 235 extends across the back of the stand between the posts 132 to provide additional rigidity. Rails 236 are arranged in parallel relation under the stand and are supported on spacer strips 238. The rails and the spacer strips are secured together by screws 240 which are threaded into anchors 242 in the floor 244. The mounting of the rails in the floor is substantially the same as that shown in FIG. 8, and the surface of the rails 236 is substantially the same height above the surface of the floor as the surface of the rails 146. A false floor is preferably built up on the surface of the floor 244 by laying sheets 246 of plywood or other sheet material on the floor.

The peak joint stand is temporarily secured to the rails 236 by T-slot bolts 248 which are received in sleeves 250 at the bottom of each of the legs 132. The head of the bolt 248 overlaps the rail 236, as shown in FIG. 16, and when the nut 252 is tightened against the end of the sleeve, the bolt head is drawn against the rail. When the nuts 252 on each of the legs 132 is loosened, the stand is free to slide along the rails 236.

In assembling the apparatus of this invention, the heel joint stands, the bottom chord panel point stands and the bottom chord splice stands are mounted on the rails 146 in the positions shown in FIGS. 1 and 2. The peak joint stand is mounted on the rails 236 in position for fabricating a roof truss of the size and shape desired. The peak joint stand is anchored rigidly to the rails 236 by tightening the nuts 252 on the T-slot bolts 248. Similarly, the bottom chord stands are secured to the rails 146 by tightening the respective nuts 164 on the T-slot bolts 162. When the stands are securely anchored in position, a top chord member 4 is laid between the peak joint and heel joint stands. The top chord member is carefully positioned against the peak joint stop 222 and the plunger 212 of the heel joint clamp is extended to urge the top chord member into engagement with the end of the upright portion 202 of the bar 200. Then, using the top chord as a guide, the top chord panel point stand is positioned under the top chord. The nuts on the T-slot bolts 54 and 86 are loosened to permit the bar members 46 and 80 to slide along the rails 62. Also, the nut 50 on the bolt 48 is loosened to permit the plate 36 to swing about the bolt 44. The outer edge of the top chord is positioned against the upright side of the angle bar 32, as shown in FIG. 6. The nut 50 is then tightened to prevent rotation of the plate 36 and the nuts on the T-slot bolts 54 and 86 are tightened to prevent the bars 46 and 80 from sliding or turning relative to the rails 62.

Metal truss plates with teeth projecting upwardly are positioned on the floating plates 120 of the right and left top chord panel points. Metal truss plates are also positioned on the respective floating plates 138 of the peak joint stand and the bottom chord stands. The bottom chord 2 is then laid on top of the bottom chord stands and positioned against the top chord members 4. The web stop blocks 192 of the right and left bottom chord panel point jigs are positioned to receive the tension and compression web members between the stop blocks. Compression and tension web members 6 and 8 are then positioned on the bottom chord panel point stands and on the top chord panel point stands and peak joint, as shown in FIGS. 1 and 2. The metal truss plates are then applied to the top of the wood members with the teeth of the plate projecting downwardly toward the wood members. The truss is then assembled in position for having the truss plates pressed into the wood members. If it is desired to prestress the truss, a prestressing load is applied at the center of the bottom chord. The prestressing load may be applied by the toggle clamp 176 on the bottom chord splice stand, shown in FIGS. 12 and 13. The peak joint stop 222, the upright bar 32 on the top chord panel point jigs, and the plunger 212 at the heel joint resist displacement of the top chord as the center of the bottom chord is deflected toward the peak joint.

The truss plates at each of the joints are pressed into the wood members by the press platens 106 and 112 on the cart 26. The cart is moved into the top chord panel point stand 28 as shown in FIG. 6 and hydraulic fluid is then supplied to the cylinder 108 to urge the upper platen 112 toward the lower platen 106, and thereby pressing the metal truss plates firmly into the wood members. The platen 112 is then retracted and the cart is moved from the top chord panel point station 24 to the next station. The process is repeated at each of the stations until the cart has moved all the way around the outside of the truss and all of the truss plates are securely embedded in the wood members. Of course, production rates may be increased by using one cart 26 for applying the truss plates at the bottom chord stations 20 and another cart for applying the truss plates at the top chord stations 22 and 24. The cart may be readily moved from one location to another because the rails 236 and 146 are recessed below the surface of the floor and the cart easily rolls across the rails. Furthermore, the slots in the floor adjacent the rails are more narrow than the width of the wheels of the cart, so that there is no danger of the cart wheels falling into the slots.

The truss fabrication apparatus of this invention may be easily installed at any suitable location. Usually a solid floor is required so that the rails may be firmly anchored to the floor. However, there is no need for having a roof or overhead supporting structure over the apparatus, since all of the equipment is mounted on the floor. In the lumber yard, for example, this may be a particular advantage because it would permit the wood members to be moved readily into position on the stands. If some shelter is desired to protect the equipment and to permit assembly of roof trusses during inclement weather, a simple shelter may be erected over the apparatus.

Since the stands supporting the wood members are rigidly anchored to the floor, they cannot be displaced accidentally from their positions, and this ensures that the roof trusses that are made on the apparatus are substantially identical. Furthermore, the positions of the stands are readily adjusted for producing many different sizes and shapes of roof trusses.

While this invention is illustrated and described in one embodiment, it is recognized that variations and changes may be made therein without departing from the invention as set forth in the claims.

I claim:
1. A jig for supporting a top chord member of a wood roof truss during assembly comprising a bar, rail means, means for securing said rail means to a floor, means for selectively securing one end of said bar to said rail means, an upright stand, said stand including a support surface for receiving a top chord member, and means mounting said stand on the opposite end of said bar, whereby the stand firmly supports the top chord member while the roof truss is being assembled.

2. A jig for supporting a top chord member of a wood roof truss during assembly comprising a bar, means for selectively securing one end of said bar to a floor, an upright stand, said stand including a support surface for receiving a top chord member, means for mounting said stand on the opposite end of said bar, said stand mounting means including means for selectively rotating said stand relative to said bar, whereby the stand firmly supports the top chord member while the roof truss is being assembled.

3. A jig for supporting a top chord member according to claim 2 wherein said bar is hinged at said one end, and said securing means includes bolts on opposite sides of said hinge.

4. A jig for supporting a top chord member according to claim 3 wherein said securing means includes rails affixed to said floor and said bolts engage said rails for rigidly securing the bar to the floor.

5. A jig for supporting a top chord member according to claim 4 wherein said rails are spaced apart to form a gap therebetween, said bolts having a bolt head and a nut, said bolt heads being secured in said rail gap, and said bar being clamped against said rails when said bolt nuts are tightened.

6. A jig for supporting a top chord member according to claim 3 wherein said bolts are substantially equally spaced from said hinge.

7. A jig for supporting a top chord member according to claim 3 wherein said support surface lies in a substantially horizontal plane, said rotating means including a pivot pin interconnecting said stand and said bar for relative rotation about a vertical axis, said axis being spaced from said one bar end.

8. A jig for supporting a top chord member according to claim 7 wherein said one bar end includes a hinge having a hinge pin positioned to swing said one bar end about a vertical axis relative to the remainder of said bar.

9. A jig for supporting a top chord member according to claim 2 wherein said rotating means includes a circular plate and lock means cooperating with said plate, said plate and said lock means being mounted between said bar and said stand.

10. A jig for supporting a top chord member according to claim 7 wherein said circular plate is rigidly secured on said stand, said rotating means including a pivot pin extending through said plate and said bar approximately at the center of said circular plate, said lock means including a clamp member mounted on said bar adjacent the peripheral edge of said plate, said clamp member overlapping said peripheral edge and said lock means including means for tightening said clamp member against said edge to prevent rotation of said plate relative to said bar.

11. A jig for supporting a top chord member according to claim 2 wherein said stand includes shelf means on opposite sides of the stand below said support surface, a flat plate supported loosely on said shelf means, said stand including upright frame members on said stand opposite sides, said frame members defining an opening in said stand, said opening extending continuously from adjacent said stand mounting means to said flat plate, whereby press means may be inserted into the interior of said stand for pressing connector plates into said top chord member.

12. In combination, apparatus for assembling wood roof trusses of the type having pressed in truss plates comprising a plurality of individual stands, each of said stands having an open frame at the top thereof for supporting a truss member, said stands each having a pair of shelves on opposite sides of the stand, a plate extending between said pair of shelves, and a wheeled cart having a press thereon, said press having a fixed platen and a movable platen mounted in opposed relation on a press frame, said frame being hingedly mounted on said cart, and said stands each having an opening in one side for receiving said press, whereby the platens are positioned on opposite sides of the plate for pressing truss plates into wood members.

13. Apparatus according to claim 12 including rails secured in a floor, said rails being recessed in said floor, said rails and said floor cooperating to form a substantially continuous plane surface for supporting said cart, said stands having means for selectively securing said stands to said rails.

14. Apparatus according to claim 12 wherein one of said stands has a peak joint stop, said stop including a pair of bars hinged together at one end, and means for securing said stop on said frame for receiving top chord members between said bars.

15. Apparatus according to claim 12 wherein one of said stands has a bottom chord splice guide, said guide having a bar extending across said frame, means for selectively securing said bar to said frame, and a clamp on said bar having a movable plunger, whereby the plunger engages the bottom chord for prestressing the truss.

16. Apparatus according to claim 12 wherein one of said stands has a pair of bottom chord panel point guides, said guides being in the form of blocks having a slot therein, said blocks being mounted on said frame with a portion of the frame being received in said slot, and means on the blocks for securing said blocks to said frame.

17. Apparatus according to claim 12 wherein one of said stands has a heel joint fixture including a clamp, said clamp having a plunger, said frame having a guide bar opposite said plunger, whereby a top chord is clamped between said plunger and said bar.

18. Apparatus for assembling wood roof trusses comprising bottom chord rails, peak joint rails, and top chord panel point rails, means for securing said rails on a floor, said peak joint rails extending substantially at right angles to said bottom chord rails, said panel point rails extending obliquely to said bottom chord rails, a plurality of stands, means for mounting said stands on said rails, and means for selectively locking said stands to said rails, said mounting means including means for adjusting one of said stands transversely of said panel point rails.

19. Apparatus according to claim 18 wherein said stands each have a pair of shelves on opposite sides of the stand, a plate extending between said pair of shelves, said stands having an opening in one side, said side opening extending substantially continuously from the bottom of the stand to the top of the stand.

20. Apparatus according to claim 18 wherein said stands are adjustable longitudinally of said bottom chord rails and said peak joint rails.

21. A press cart for assembling wood roof trusses comprising a cart frame, wheel means supporting said cart frame for movement over a floor, a press, said press having an upright frame with upper and lower cantilever members joined together by a web member, a fixed platen and a movable platen on said press frame, said platens being mounted at the distal end of said cantilever members, power means for displacing said movable platen toward said fixed platen, hinge means adjacent said web member for mounting said press frame on said cart frame for vertical swinging movement about an axis transverse of said cantilever members and spaced from said distal ends, whereby said press frame swings vertically to compensate for variations in elevation above the floor of articles pressed between said platens.

22. A press cart according to claim 21 wherein said transverse axis is below the height of said fixed platen with respect to said cart frame.

23. A press cart according to claim 21 wherein said fixed platen is below said movable platen.

References Cited
UNITED STATES PATENTS

| | | | |
|---|---|---|---|
| 2,983,292 | 5/1961 | McKinley | 144—288 |
| 2,996,721 | 8/1961 | Black | 227—152 |
| 3,068,483 | 12/1962 | Moehlenpah et al. | 227—152 |
| 3,068,484 | 12/1962 | Moehlenpah et al. | 227—152 |
| 3,100,301 | 8/1963 | Black | 227—152 |
| 3,211,085 | 10/1965 | Zeppetello | 100—229 X |
| 3,238,867 | 3/1966 | Jureit et al. | 100—214 |
| 3,241,585 | 3/1966 | Jureit | 144—288 |
| 3,249,041 | 5/1966 | Johnson | 100—214 |

BILLY J. WILHITE, *Primary Examiner.*